United States Patent Office 3,592,835
Patented July 13, 1971

3,592,835
METHOD OF PREPARING THIONCARBAMATE ESTERS
Robert Andrew Bauman, 10 Landing Lane,
New Brunswick, N.J. 07850
No Drawing. Continuation-in-part of abandoned application Ser. No. 502,637, Oct. 11, 1965. This application Nov. 29, 1968, Ser. No. 780,242
Int. Cl. C07c *155/08*
U.S. Cl. 260—455      6 Claims

ABSTRACT OF THE DISCLOSURE

A process for the preparation of thioncarbamate esters which comprises reacting an alkyl or aryl isothiocyanate and a mono- or di-functional alcohol in a reaction medium selected from the group consisting of dialkyl sulfoxide and dialkyl formamide.

---

The present invention relates in general to thioncarbamate esters and in particular to the provision of a novel method for the preparation thereof said method being characterized in affording exceptional advantage as regards product yield, facility of implementation and the like.

This application is a continuation-in-part of U.S. application Ser. No. 502,637, filed Oct. 11, 1965 and now abandoned.

Processes for the preparation of thioncarbamate esters are well-known in the art being extensively described in the published literature both patent and otherwise. Thioncarbamate compounds can for convenience be represented according to the following structural formula:

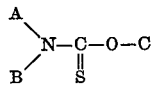

and wherein A, B and C represent various substituents such as aryl, etc. Compounds of the general type encompassed by the foregoing structural formula find utility in a wide variety of applications including, for example, without necessary limitation, pesticidal applications, stabilizers and the like. Although the methodology heretofore promulgated for purposes of preparing the aforedescribed compounds enjoys relatively widespread commercial exploitation, it has nevertheless been ascertained in practice that such methods are subjected to manifold disadvantages. Among the more prominent drawbacks there may be mentioned the failure of such methods to lend themselves to expeditious effectuation. Thus, it is invariably found that rather tedious and burdensome operations are necessary in order to give rise to feasible practice. Thus, the plurality of operations necessarily associated with much of the processing heretofore recommended detracts considerably from commercial desirability. Moreover, in many instances the materials necessarily employed i.e., in the sense of being critical to the objectives of the process in question are extremely costly thereby rendering the economics involved prohibitive. In any event, perhaps the salient disadvantage found to inhere in the thioncarbamate ester-forming processes thus far provided relates to difficulties associated with the obtention of satisfactory yield within the limitations imposed by economically feasible practice. Thus, it has been suggested to prepare thioncarbamate esters by heating an aryl isothiocyanate with a relatively large excess of an alcohol, the involved reaction being subject to catalysis by the use of a tertiary amine. Although procedures of this type have been found in most instances to be satisfactory in the case of the lower alcohols, i.e., alcohols containing up to about 6 carbon atoms, their use has proved notably inadequate in connection with the preparation of thioncarbamate esters requiring the use of higher molecular weight alcohols. Other and related techniques based upon reactions involving thiourethanes, haloamines, carbon disulfide and the like have likewise proved notoriously deficient since the yields provided thereby are for the most part intolerably inadequate.

In an effort to overcome or otherwise mitigate the foregoing disadvantages, considerable industrial activity has centered around the research and development of techniques singularly applicable to the preparation of thioncarbamate esters and substantially devoid of the disadvantages and shortcomings characterizing prior art methods. Although much in the way of meritorious achievement has been accomplished, it has nevertheless been found that the overall improvement realized is in many instances of marginal significance only. Thus, procedures devised specifically to make possible improved yield invariably give use to other difficulties including, for example, the mandatory use of inordinately large amounts of reactants, special processing equipment, inordinately protracted reaction periods etc. Thus, one of the procedures recommended requires that the alcohol reactant be initially converted to a form which is purportedly more reactive toward the isothiocyanate substance. However, the improvement in yield made possible thereby is in many instances negligible. In addition, the technique is found to be efficacious with but limited types of alcohols i.e., alcohols falling within rather limited molecular weight ranges.

In accordance with the discovery forming the basis of the present invention, it has been ascertained that the production of thioncarbamate esters can be readily and easily effected according to a technique simple of implementation and involving as a critical feature the employment of a solvent medium selected from a highly delimited class of materials.

Thus, a primary object of the present invention resides in the provision of a process for the preparation of thioncarbamate esters wherein the aforedescribed disadvantages are eliminated or at least mitigated to a substantial degree.

A further object of the present invention resides in the provision of a process for the preparation of thioncarbamate esters wherein problems associated with the optimization of product yield are substantially eliminated.

Another object of the present invention resides in the provision of a process for the preparation of thioncarbamate esters capable of advantageous implementation within the limitations imposed by economically feasible practice.

A still further object of the present invention relates to the provision of a relatively delimited class of thioncarbamate ester compounds.

Other and related objects and advantages of the present invention will become more apparent hereinafter as the description proceeds.

The attainment of the foregoing and the related objects is made possible in accordance with the present invention which in its broader aspects includes the provision of a process for the preparation of thioncarbamate esters which comprises contacting a compound selected from the group consisting of N-alkyl and N-aryl isothiocyanates with a hydroxyl-containing compound selected from the group consisting of (a) mono- and di-functional aliphatic alcohols containing from 1 to 30 carbon atoms, and (b) alkali metal salts of (a), said contacting being effected within a temperature range of from about 20° C. to about 100° C. and in the presence of a solvent selected from the group consisting of (1) an alkyl sulfoxide containing from 1 to 4 carbon atoms e.g., dimethyl sulfoxide, diethyl sulfoxide, di-n-butyl sulfoxide etc. and (2) a dialkyl formamide containing from 1 to 4 carbon atoms e.g., dimethyl formamide, diethyl formamide, diisopropyl formamide etc.

Examples of thioncarbamate esters which may be readily and conveniently prepared according to the process described herein include, without necessary limitation, those of the following structural formula:

$$\left( R_1-NH-\overset{S}{\underset{\|}{C}}-O \right)_n R$$

wherein $n$ is 1 or 2 and wherein $n$ is 1,

R is selected from the group consisting of (a)

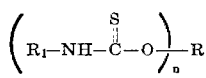

wherein $R_2$ represents hydrogen or halogen e.g., chlorine or bromine and (b) alkyl of 1 to 20 carbon atoms e.g., methyl, ethyl, propyl butyl, pentyl, octyl, nonyl, decyl, tridecyl pentadecyl, octadecyl etc. R represents (a) alkyl of from 1 to 30 carbon atoms e.g., methyl, ethyl, propyl, butyl, pentyl, octyl, nonyl decyl, tridecyl, pentadecyl, octadecyl, eicosyl, docosyl, tetracosyl, heptacosyl, octacosyl etc. (b) alkenyl of from 2 to 6 carbon atoms e.g., allyl, 3,4-butenyl, 4,5-pentenyl etc. (c) tertiary alkyl of up to 6 carbon atoms e.g., t-butyl, (d) alkoxyalkylene of from 1-4 carbon atoms e.g., ethoxy ethylene, 3-methoxypropylene, 2-propoxy-n-butylene etc. and (e) dialkylaminoalkylene, said alkyl and alkylene moieties containing from 1-4 carbon atoms and wherein when $n$ is 2, $R_1$ has the aforedescribed significance and R represents (a) alkylene of 3 to 16 carbon atoms e.g., methylene, propylene, $+CH_2\}_3$, pentylene, $+CH_2\}_5$, octylene $+CH_2\}_8$, tridecydene $+CH_2\}_{13}$, etc. (b) alkylene oxy alkylene e.g.,

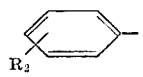

said alkylene containing from 1 to +5 carbon atoms.

It is critically essential to the improvements provided by the present invention that the aforedescribed reaction scheme be carried out in the presence of the solvent material specified i.e., alkyl sulfoxide or alternatively, dialkyl formamide. The premier importance of the function served by the limited class of solvent materials required for use in accordance with the present invention is readily manifest from the fact that allyl as well as other alkenyl esters are readily obtainable in excellent yield and in substantially reduced reaction periods, esters of this type long considered to be unobtainable by conventional processing such as typified by the prior art. Thus, the difficulties encountered in connection with attempts to produce alkenyl esters by conventional isothiocyanate—alcohol reactions prove substantially insurmountable.

As will be readily recognized, the salient feature of the present invention and that which represents the vital point of departure over methodology heretofore described in the prior art resides in the use of an alkyl sulfoxide or dialkyl formamide as the solvent medium in the esterification of isothiocyanates. Moreover, the utilization of these particular solvents makes possible the obtention of exceptionally high product yields on the order of 85–95% before recrystallization and 50–75% after recrystallization despite the use of reaction periods approximating only 2–3 hours and without excess alcohol. This is to be contrasted with prior art procedures wherein yields of only about 30 to about 40% of theory are obtainable despite the employment of reaction periods approximating up to four days.

The proportions of solvent employed in the practice of the present invention are not particularly critical apart from the intrinsic requirement that such solvent be present in amounts sufficient to permit efficient dispersing and contacting of the reactants employed. In any event, optimum realization of the improvements provided herein are assured with the use of the solvent material in amounts sufficient to yield a solvent-isothiocyanate mole ratio within the range of about 4 to about 10. In accordance with preferred practice, it is found advantageous to employ the alkyl sulfoxide or dialkylformamide compound in substantially dry form in order to minimize if not eliminate any possibility of significant thiourea formation. In order to determine whether or not the solvent material selected for use conforms with the limitations regarding moisture content, a sample of the alkyl sulfoxide or dialkylformamide is heated with an isothiocyanate. The mixture is then poured into water, isolated and the petroleum ether-insoluble material weighed.

In order to insure the obtention of optimum yields, it is preferred practice that elevated temperatures be employed for the involved reaction. The specific temperature selected may vary over a wide range; however, beneficial results are noted to obtain with the use of temperatures falling within the range of about 20° C. to about 100° C. with a range of 80° C. to 100° C. being particularly preferred. Within the range stipulated, it would usually be found that increased temperature values lead to corresponding increases in product yield i.e., within limits, temperature effects are somewhat catalytic in respect of rate of product formation.

The isothiocyanate, alcohol and/or alkoxide reactants are preferably employed in stoichiometric amounts. However, it will be understood that departures from such amounts may be dictated in a particular circumstance depending upon the requirements of the processor. In any event, efficacious processing can be assured by the utilization of the isothiocyanate compound in amounts sufficient to yield an isothiocyanate-to-alcohol or alkoxide mole ratio within the range of from about 0.9 to about 1.1, with equimolar amounts being particularly preferred.

The alcohol reactant contemplated for use in accordance with the present invention may likewise be selected from a relatively wide range of materials, the salient requirement with respect thereto being that such material be capable of ester formation with the isothiocyanate component. Thus, suitable alcohols include without necessary limitation those of the following formula:

$$X-R-OH$$

wherein R has the significance assigned previously. Primary and secondary alcohols, both mono- and dihydric, include, without necessary limitation, the following:

(A) Alkanols containing from 1–30 carbon atoms

| | | |
|---|---|---|
| ethanol | octanol | tetracosanol |
| n-propanol | dodecanol | pentacosanol |
| n-butanol | hexadecanol | heptacosanol |
| isobutanol | octadecanol | octacosanol |
| sec-butanol | eicosanol | nonacosanol ... etc. |

(B) Lower* alkoxy, lower alkanols ethoxyethanol  
3-ethoxypropanol  
3-methoxypropanol  
2-n-butoxypropanol  
2-n-propoxybutanol  
3-ethoxybutanol ... etc.

*"Lower" is used throughout to connote alkyl of from 1-4 carbon atoms.

(C) Lower dialkylamino-lower alkanols dimethylaminoethanol  
di-n-propylaminoethanol  
di-n-butylaminoethanol  
3-diethylaminobutanol ... etc.

(D) Unsaturated alcohols containing from 2-6 carbon atoms allyl alcohol  
3,4-butene-1-ol  
4-5-pentene-1-ol ... etc.

(E) Dihydric alcohols containing from 1-15 carbon atoms 1,2-ethane diol  
1,2-propane diol  
1,4-tetramethylene diol  
1,6-hexamethylene diol  
1,10-decamethylene diol  
1,13-tridecamethylene diol ... etc.

(F) Ether glycols

Compounds of the formula

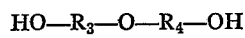

wherein $R_3$ and $R_4$ represent, independently, alkylene of 1-15 carbon atoms e.g.,

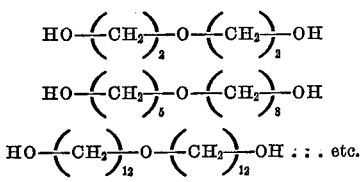

In accordance with the present invention, the alcohol compound may be provided in the form of its alkali metal salt. This expedient represents preferred practice in those instances wherein the isothiocyanate material selected for use demonstrates sub-optimum reactivity towards the selected alcohol. Thus, the alcohol component may be initially converted to the sodium salt, potassium salt, i.e., species possessing the requisite reactivity, and thereafter introduced into the reaction medium. Alternatively, the salified alcohol i.e., alkoxide may be generated in situ in the reaction medium by mutual contacting of the isothiocyanate and alcohol components in the presence of a tertiary alkoxide such as an alkali metal tertiary alkoxide, specific representatives including by way of example only, potassium tert-butoxide, sodium tert-butoxide and the like. When proceeding according to the latter embodiment, it is recommended to employ the tertiary alkoxide in amount equimolar to that of the alcohol to be reacted. Procedures based upon the use of the alcoholate as the true reactive species prove particularly beneficial in connection with the preparation of the N-alkyl thioncarbamate esters as well as esters derived from tertiary alcohols.

Isothiocyanate compounds suitable for use in the practice of the present invention encompass a relatively wide range of materials which in general may be defined as including the N-aryl and N-alkyl isothiocyanates. Representative materials include those of the formula $R_1NCS$ wherein $R_1$ has the significance previously assigned. As particular examples thereof there may be mentioned, without necessary limitation, the following:

phenyl isothiocyanate  
p-chlorophenyl isothiocyanate  
p-bromopheoyl isothiocyanate  
methyl isothiocyanate  
ethyl isothiocyanate  
n-butyl isothiocyanate  
isobutyl isothiocyanate  
n-octyl isothiocyanate  
tetradecyl isothiocyanate  
nonadecyl isothiocyanate ... etc.

As previously indicated, the esterification reaction is most effectively carried out under elevated temperatures. After allowing the reaction to proceed to completion a period normally falling within the range of from about 2-3 hours, the reaction mixture may be easily worked up by pouring same into water this operation serving to precipitate the thioncarbanilate as a solid. The compounds prepared from the monohydric alcohols are readily soluble in petroleum ether. Thus, they may be readily separated from an insoluble by-product i.e., the symmetrical thiourea derived from the isothiocyanate. The diol esters may be purified by washing with ethyl ether which serves to dissolve the thiourea preferentially i.e., thioncarbanilate remains as a precipitate.

The compounds produced in accordance with the process of the present invention comprise effective antimicrobial agents and are accordingly eminently useful as ingredients in anti-bacterial compositions in general e.g., pesticidal compositions, antioxidant compositions etc. Particularly preferred compounds in accordance with the present invention comprise those of the following structural formula:

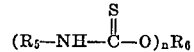

wherein when $n$ is 1 or 2 and wherein when $n$ is 1, $R_5$ represents alkyl of from 1-20 carbon atoms, e.g., methyl, ethyl, propyl, butyl, octyl, dodecyl, hexadecyl, octadecyl etc., with particularly advantageous properties being noted for those compounds which obtain when $R_5$ represents lower alkyl containing from 1-4 carbon atoms; $R_6$ represents (a) alkyl of from 1-30 carbon atoms (b) alkenyl of from 3-6 carbon atoms (c) tertiary alkyl containing from 4-6 carbon atoms (d) alkoxy alkylene of from 3-15 carbon atoms in toto. and (e) dialkylaminoalkylene, said alkyl and alkylene moieties containing from 1-4 carbon atoms;

and wherein when $n$ is 2, $R_5$ is selected from the group consisting of (1)

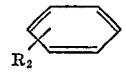

wherein $R_2$ represents hydrogen or halogen and (2) alkyl of 1-20 carbon atoms and $R_6$ represents
  (a) alkylene of 3-16 carbon atoms and
  (b) alkylene oxy alkylene each of said alkylene moieties containing from 2-16 carbon atoms.

The following examples are given for purposes of illustration only and are not to be considered as necessarily constituting a limitation on the present invention.

EXAMPLES 1-23

The following table summarizes melting point and other data obtained for various compounds prepared in accordance with the present invention. The process employed in the preparation of thioncarbamate esters derived from the reaction of primary and secondary alcohols with N-arylisothiocyanates comprises the following sequence of operations.

The isothiocyanate and alcohol components are mixed in stoichiometric amounts in about 2 to about 5 volumes of methyl sulfoxide. The mixture was heated in a closed container on a steambath (85°-95° C.) for a period of approximately three hours. Thereupon, the reaction mixture was cooled to room temperature (about 70-75° F.) and poured with stirring into about 20 volumes of cold water, the latter maintained at a temperature of 40°-50°

TABLE 1.—MELTING POINTS AND ANALYTICAL DATA FOR THIONCARBAMATE ESTERS

| Ex. No. | R | $\eta$ | M.P., °C | Formula | C Calcd. | C Found | H Calcd. | H Found | N Calcd. | N Foun | S Calcd. | S Found |
|---|---|---|---|---|---|---|---|---|---|---|---|---|
| | | | | $\left(Cl{-}\bigcirc{-}NHCSO\right)_\eta R$ | | | | | | | | |
| 1 | $C_2H_5$ | 1 | a 101–103 | | | | | | | | | |
| 2 | $C_3H_7$ (n) | 1 | b 53.5–58 | | | | | | | | | |
| 3 | $CH_2CH=CH_2$ | 1 | 87–88 | $C_{10}H_{10}ClNOS$ | 52.74 | 52.60 | 4.43 | 4.47 | 6.15 | 6.36 | 14.08 | 14.88 |
| 4 | $C_4H_9$ (n) | 1 | c 73.2–74.7 | | | | | | | | | |
| 5 | $C_4H_9$ (iso) | 1 | 68–69 | $C_{11}H_{14}ClNOS$ | 54.20 | 54.22 | 5.79 | 5.88 | 5.75 | 5.66 | 13.15 | 13.07 |
| 6 | $C_4H_9$ (sec) | 1 | 87.5–89 | $C_{11}H_{14}ClNOS$ | 54.20 | 54.91 | 5.79 | 5.94 | 5.75 | 5.75 | 13.15 | 13.11 |
| 7 | $C_4H_9$ (tert) | 1 | 105.0–105.1 | $C_{11}H_{14}ClNOS$ | 54.20 | 53.76 | 5.79 | 5.76 | 5.75 | 5.83 | 13.15 | 13.21 |
| 8 | $C_{10}H_{21}$ (n) | 1 | 46–47.5 | $C_{17}H_{26}ClNOS$ | 62.26 | 62.09 | 7.99 | 7.89 | 4.27 | 4.89 | 9.78 | 9.94 |
| 9 | $C_{16}H_{33}$ (n) | 1 | 67–68 | $C_{23}H_{38}ClNOS$ | 67.04 | 67.66 | 9.29 | 9.27 | 3.40 | 3.47 | 7.78 | 7.69 |
| 10 | $CH_2CH_2OC_2H_5$ | 1 | 101–103.5 | $C_{11}H_{14}ClNO_2S$ | 50.86 | 51.20 | 5.43 | 5.51 | 5.39 | 5.48 | 12.34 | 12.27 |
| 11 | $CH_2CH_2N(CH_3)_2$ | 1 | 73.5–75 | $C_{11}H_{15}ClN_2OS$ | 51.05 | 51.28 | 5.84 | 5.88 | 10.83 | 10.34 | 12.39 | 13.08 |
| 12 | $(CH_2)_6$ | 2 | 126.5–129.5 | $C_{20}H_{22}Cl_2N_2O_2S_2$ | 52.51 | 52.43 | 4.85 | 4.35 | 6.13 | 5.92 | 14.02 | 13.45 |
| 13 | $(CH_2)_{10}$ | 2 | 151–152 | $C_{24}H_{30}Cl_2N_2O_2S_2$ | 56.13 | 56.78 | 5.89 | 5.99 | 5.46 | 5.55 | 12.49 | 12.58 |
| 14 | $(CH_2)_2O(CH_2)_2$ | 2 | 130.3–132 | $C_{18}H_{18}Cl_2N_2O_3S_2$ | 48.54 | 48.04 | 4.07 | 3.82 | 6.29 | 6.19 | 14.40 | 13.83 |
| | | | | $\left(Br{-}\bigcirc{-}NHCSO\right)_\eta R$ | | | | | | | | |
| 15 | $CH_3$ | 1 | d 103–104 | | | | | | | | | |
| 16 | $C_2H_5$ | 1 | e 105–106.5 | | | | | | | | | |
| 17 | $(CH_2)_{10}$ | 2 | 140–142 | $C_{24}H_{30}Br_2N_2O_2S_2$ | 47.84 | 47.84 | 5.02 | 4.52 | 4.65 | 4.68 | 10.64 | 10.56 |
| | | | | $\left(\bigcirc{-}NHCSO\right)_\eta R$ | | | | | | | | |
| 18 | $C_2H_5$ | 1 | f 68–69.5 | | | | | | | | | |
| 19 | $CH_2CH=CH_2$ | 1 | g 66.5–66.7 | $C_{10}H_{11}NOS$ | 62.14 | 61.97 | 5.74 | 5.76 | 7.25 | 7.23 | 16.59 | 16.10 |
| 20 | $(CH_2)_{10}$ | 2 | 113–115 | $C_{24}H_{32}N_2O_2S_2$ | 64.83 | 64.97 | 7.26 | 6.96 | 6.30 | 6.50 | 14.42 | 14.26 |
| | | | | $(C_2H_5NHCSO)_\eta R$ | | | | | | | | |
| 21 | $C_4H_9$ (tert) | 1 | h 88–89 | | | | | | | | | |
| 22 | $C_{13}H_{27}$ (n) | 1 | 36.6–37.9 | $C_{16}H_{33}NOS$ | 66.84 | 67.35 | 11.57 | 11.55 | 4.87 | 5.11 | 11.15 | 11.28 |
| 23 | $(CH_2)_{10}$ | 2 | 58–60 | $C_{16}H_{32}N_2O_2S_2$ | 55.13 | 55.61 | 9.26 | 8.53 | 8.04 | 7.92 | 18.40 | 18.47 | a M.P. 103–104°, ref. 3.   b M.P. 51–52°, ref. 3.   c M.P. 72–74°, ref. 3.   d M.P. 101–102°, ref. 3.   e M.P. 104–105°, ref. 3.   f M.P. 67–68°, ref. 3.
g M.P. 75–77°, ref. 2.   h M.P. 86.5°, ref. 2.
Ref. 2.—R. W. Bost and E. R. Andrews, J. Am. Chem. Soc., 65, 900 (1943).
Ref. 3.—D. Gockeritz and R. Pohloudek-Fabini Pharmazeutische Zentralhalle, 102, 685 (1963).

F. The reaction product precipitated and was removed in a convenient manner. The precipitate thus separated was thereafter washed with water and air-dried. The monofunctional esters were extracted from the precipitate into hydrocarbon solvent (Skellysolve B) and allowed to crystallize. The difunctional esters were washed free of impurities with ether and recrystallized from alcohols or aqueous ethanol. The foregoing procedure was employed in the preparation of the compounds of Examples 1–6, 10–12, 14–16 and 18–19.

The process employed in the preparation of thioncarbamate esters derived from tertiary alcohols is as follows, specific reference being made to the preparation of o-(tert-butyl)-p-chlorothiocarbanilate).

A methyl sulfoxide solution (5 milliliters) of 1.45 grams (0.013 mol) of potassium tertiary butoxide was prepared and freed from a small amount of insoluble material by centrifuging the mixture. To the clear solution 2.0 grams (0.012 mole) of p-chlorophenyl isothiocyanate was added. An exothermic reaction occurred and a deep amber-colored solution was produced. The solution was cooled under tap water (10° C.) and then allowed to stand a few minutes at room temperature (20–25° C.). The reaction product was precipitated by stirring the methyl sulfoxide solution into cold water (10–15° C.). The 2.2 grams of yellow solid so obtained was completely soluble in 100 milliliters of hexane from which it crystallized in long needles. The foregoing procedure was employed in the preparation of the compounds of Examples 7 and 21.

The N-alkyl thioncarbamates as well as those derived from higher molecular weight alcohols i.e., having carbon contents in excess of 8, were prepared according to the following procedure, specific reference being made to the preparation of o-tridecyl-N-ethylthioncarbamate.

The compound, o-tridecyl-N-ethylthioncarbamate was prepared by adding 3.0 grams (0.015 mole) of 1-tridecanol to a solution of 1.68 grams (0.015 mole) of potassium tertiarybutoxide in 10 milliliters of methyl sulfoxide. The resultant slurry was stirred for 35 minutes whereupon 1.3 grams (0.015 mol) of ethyl isothiocyanate was added with stirring. The clear methyl sulfoxide reaction mixture turned to a yellow solution (a slightly exothermic reaction) and after about 1 hour was poured into 200 milliliters of water and neutralized with hydrochloric acid. The reaction product separated as an oil which, after washing with water, crystallized spontaneously. The 3.4 grams of product was recrystallized from aqueous alcohol (95%) to yield 2.9% grams of tiny needles a yield of 68% of theory.

In view of the somewhat sub-optimum reaction rates characterizing tertiary-alcohols, N-alkyl isothiocyanates as well as the higher molecular weight alcohols, it is usually found beneficial to accomplish thioncarbamate formation by providing the alcohol compound in the form of its alkali metal salt derivative, this expedient being effected according to the procedures hereinbefore described i.e., by converting the alcohol to alcoholate either prior to addition to the reaction medium or alternatively, by in situ formation. Although this procedure is preferred for purposes of achieving highly feasible reaction rates in connection with reactants of lower reactivity, it should be understood that the present invention is in no wise limited thereto. Thus, the utilization of the specific solvent materials in the present invention make possible manifold improvements with respect to yield, ease of implementation etc. over the prior art, despite the employment of the lower-reactivity materials in non-derivatized form i.e., the employment of the alcohols per se as to be distinguished from the alkoxide derivative. However, as a matter of practical expediency, particular circumstances may dictate the use of the alcoholate method. In any event, such matters lie within the discretion of the practitioner.

Results similar to those described are obtained when the procedures exemplified are repeated but employing in lieu of the particular reactants specified the following:

| Ex. No. | Isothiocyanate | Alcohol | Procedure |
|---|---|---|---|
| 24 | Cl—⟨⟩—NCS | $CH_3(CH_2)_{18}CH_2OH$ | Ex. 22. |
| 25 | ⟨⟩—NCS | $CH_3(CH_2)_{21}CH_2OH$ | Do. |
| 26 | Br—⟨⟩—NCS | $CH_3(CH_2)_{26}CH_2OH$ | Do. |
| 27 | Same as above | $HO(CH_2)_3OH$ | Ex. 12. |
| 28 | ⟨⟩—NCS | $HO(CH_2)_{14}OH$ | Do. |
| 29 | Cl—⟨⟩—NCS | $HOCH_2(CH_2OCH_2)_2CH_2OH$ | Do. |
| 30 | Same as above | $HOCH_2CH=CHCH_2OH$ | Do. |
| 31 | do | $CH_3CHOH(CH_2)_2CHOHCH_3$ | Do. |
| 32 | ⟨⟩—NCS | HO—⟨S⟩—OH | Do. |
| 33 | Cl—⟨⟩—NCS | $CG_2=CH-CH_2-CH_2-OH$ | Ex. 3. |
| 34 | Same as above | $C_2H_5C(CH_3)_2$ <br> $\quad\quad\,\,\vert$ <br> $\quad\quad\,\,OH$ | Ex. 7. |
| 35 | ⟨⟩—NCS | $(C_2H_5)_2C-CH_3$ <br> $\quad\quad\,\,\vert$ <br> $\quad\quad\,\,OH$ | Do. |
| 36 | Br—⟨⟩—NCS | $C_2H_5-O-CH_2-CH_2-OH$ | Ex. 1. |
| 37 | Cl—⟨⟩—NCS | $n-C_4H_9O(CH_2)_2OH$ | -------- |
| 38 | ⟨⟩—NCS | $HO-CH_2-CH_2-N(C_2H_5)_2$ | Ex. 1. |
| 39 | Cl—⟨⟩—NCS | $HO-CH_2-CH_2-CH_2-N(nC_3H_7)_2$ | Do. |
| 40 | $Sec-C_4H_9-NCS$ | $CH_3-OH$ | Ex. 22. |
| 41 | $n-C_8H_{17}-NCS$ | $CH_3(CH_2)_8CH_2OH$ | Do. |
| 42 | $n-C_{13}H_{27}-NCS$ | $CH_3-(CH_2)_{10}CH_2-OH$ | Do. |
| 43 | $CH_2=CHCH_2NCS$ | $CH_3-(CH_2)_{16}CH_2-OH$ | Do. |
| 44 | $n-C_{18}H_{37}-NCS$ | $CH_3-(CH_2)_{24}CH_2-OH$ | Do. |
| 45 | $n-C_9H_{19}NCS$ | $CH_2=CH-CH_2-OH$ | Do. |
| 46 | $iso-C_3H_7NCS$ | $(CH_3)_3C-OH$ | E. 7. |
| 47 | $n-C_7H_{15}NCS$ | $CH_3-O-CH_2-CH_2-OH$ | Ex. 22. |
| 48 | $n-C_{10}H_{21}NCS$ | $C_2H_5-O(CH_2)_3CH_2OH$ | Do. |
| 49 | $n-C_{12}H_{25}NCS$ | $HO-(CH_2)_3-OH$ | Do. |
| 50 | $n-C_5H_{11}NCS$ | $HO-(CH_2)_6-OH$ | Do. |
| 51 | $sec-C_4H_9NCS$ | Same as above | Do. |
| 52 | $C_2H_5NCS$ | $HOCH_2(CH_2OCH_2)_2CH_2OH$ | -------- |
| 53 | $C_9H_{19}NCS$ | $CH_3CHOH(CH_2)_2CHOHCH_3$ | -------- |

Similarly favorable results are obtained when the procedures described are repeated but employing as the solvent material, dimethyl formamide. The formamide type solvents prove especially effective in connection with syntheses involving the use of primary and secondary alcohols containing up to about 10 carbon atoms. As will be noted, Examples 8, 9, 13, 17, 20, 22 and 23 are based on processes employing both the alcohol and tertiary alkoxide compound components in the reaction medium, this system leading to the in situ generation of alcoholate the latter comprising the active ester-forming species. When the process of these examples is repeated but omitting the tertiary alkoxide compound it is found that the ester-forming reaction rate is reduced.

Results similar to those described in the examples are obtained when the procedure described therein are repeated but employing in lieu of dimethyl sulfoxide and dimethyl foramide the following: di-n-propyl formamide, diethyl formamide, diethyl sulfoxide etc.

Although the present invention has been illustrated specifically with reference to the employment of aliphatic alcohols it will be understood that other materials may be similarly employed e.g., alcohols such as typified by cyclohexanol, dicyclopentenyl alcohol etc. Moreover, the isothiocyanate reaction may likewise be selected from a relatively wide range of materials including acyclic, alicyclic and carbocyclic isothiocyanates. It will be understood that the sole criteria governing the selection of isothiocyanate and alcohol ingredients in accordance with the present invention is that such materials be capable of undergoing esterification under the conditions specified.

The present invention has been described with respect to certain preferred embodiments; however, it will be understood that various modifications and ramifications thereof may be practiced without departing from the spirit and scope of the present invention.

What is claimed is:

1. In a process for the preparation of thioncarbamate esters wherein a compound selected from the group consisting of N-alkyl of 1 to 30 carbon atoms and N-phenyl isothiocyanates is reacted with a hydroxyl-containing compound selected from the group consisting of
   (a) mono- and di-functional hydrocarbyl aliphatic alcohols containing from 1–30 carbon carbon atoms, lower alkoxy lower monoalkanols; lower dialkanolamino lower monoalkanols and ether glycols, and
(b) alkali metal salts of (a), said reacting step being effected within a temperature range of from about 20° C. to about 100° C., the improvement comprising performing said reaction in the presence of a solvent material selected from the group consisting of
(1) a dialkyl sulfoxide said alkyl groups each containing from 1–4 carbon atoms and
(2) a dialkyl formamide said alkyl groups each containing 1–4 carbon atoms.

2. A process according to claim 1 wherein said solvent comprises methyl sulfoxide.

3. A process according to claim 1 wherein said process comprises dimethyl formamide.

4. In a process for the preparation of thioncarbamate esters of the following structural formula:

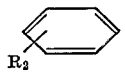

wherein $n$ is 1 or 2 and wherein when $n$ is 1, $R_1$ is selected from the group consisting of
(a)

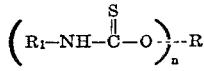

wherein $R_2$ represents hydrogen or halogen,
(b) alkyl of 1–20 carbon atoms; R is selected from the group consisting of
(1) alkyl of from 1–30 carbon atoms
(2) alkenyl of from 2–6 carbon atoms
(3) tertiary alkyl of up to 6 carbon atoms
(4) alkoxyalkylene said alkoxy and alkylene moieties containing from 1–4 carbon atoms and
(5) dialkylaminoalkylene said alkyl and alkylene moieties containing from 1–4 carbon atoms; and wherein when $n$ is 2, $R_1$ has the aforedescribed significance and R is selected from the group consistnig of (a) alkylene of 3–16 carbon atoms and (b) alkylene oxy alkylene each of said alkylene containing from 1–15 carbon atoms, wherein an isothiocyanate of the formula $R_1NCS$ wherein $R_1$ has the foregoing significance is reacted with a compound selected from the group consisting of
(a) alcohols of the formula X—R—OH wherein R has the foregoing significance and X represents hydrogen or hydroxyl and
(b) alkali metal salts of (a), said reacting step being effected within a temperature range of from about 20°–100° C., the improvement comprising performing said reaction in the presence of a solvent selected from the group consisting of
(a) a dialkyl sulfoxide, said alkyl groups each containing from 1–4 carbon atoms and
(b) a dialkyl formamide, said alkyl groups each containing from 1–4 carbon atoms.

5. A process according to claim 4 wherein said solvent comprises methyl sulfoxide.

6. A process according to claim 4 wherein said solvent comprises dimethyl formamide.

References Cited

UNITED STATES PATENTS

| | | | |
|---|---|---|---|
| 2,225,124 | 12/1940 | Martin | 260—398.5 |
| 2,650,876 | 9/1953 | Stewart | 71—100 |
| 3,224,863 | 12/1965 | D'Amico | 71—100 |
| 3,476,791 | 11/1969 | Newman et al. | 260—455 |
| 2,691,635 | 10/1954 | Harris et al. | 260—455X |

OTHER REFERENCES

Vladimaskaya: "Chem. Abstracts," vol. 58 (1963), p. 520.

LEWIS GOTTS, Primary Examiner

G. HOLLRAH, Assistant Examiner

U.S. Cl. X.R.

252—402; 424—300; 71—100